US012105820B2

(12) United States Patent
Ramakrishnappa et al.

(10) Patent No.: US 12,105,820 B2
(45) Date of Patent: *Oct. 1, 2024

(54) PROTECTING SELECTED DISKS ON A COMPUTER SYSTEM

(71) Applicant: Microsoft Technology Licensing, LLC, Redmond, WA (US)

(72) Inventors: Dhananjay Ramakrishnappa, Bengaluru (IN); Gregory Irving Thiel, Black Diamond, WA (US); Manoharan Kuppusamy, Redmond, WA (US); Yogesh Bansal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/361,849

(22) Filed: Jun. 29, 2021

(65) Prior Publication Data
US 2022/0027493 A1 Jan. 27, 2022

Related U.S. Application Data

(63) Continuation of application No. 16/154,197, filed on Oct. 8, 2018, now Pat. No. 11,080,416.

(51) Int. Cl.
*H04L 29/06* (2006.01)
*G06F 9/54* (2006.01)
(Continued)

(52) U.S. Cl.
CPC .......... *G06F 21/6218* (2013.01); *G06F 9/545* (2013.01); *H04L 63/101* (2013.01); *H04L 67/564* (2022.05); *H04L 67/60* (2022.05)

(58) Field of Classification Search
CPC ... G06F 21/6218; G06F 9/545; H04L 63/101; H04L 67/2819; H04L 67/32
See application file for complete search history.

(56) References Cited

U.S. PATENT DOCUMENTS

| 7,484,245 | B1 * | 1/2009 | Friedman | ................ | G06F 21/62 |
| | | | | | 726/28 |
| 7,966,643 | B2 * | 6/2011 | Nagampalli | ........ | G06F 21/6218 |
| | | | | | 709/217 |

(Continued)

FOREIGN PATENT DOCUMENTS

| CN | 1606011 A | 4/2005 |
| CN | 1667608 A | 9/2005 |

(Continued)

OTHER PUBLICATIONS

"Non Final Office Action Issued in U.S. Appl. No. 17/475,701", dated Jan. 19, 2023, 23 Pages.

(Continued)

*Primary Examiner* — Mohammad A Siddiqi
(74) *Attorney, Agent, or Firm* — Shook, Hardy & Bacon L.L.P.

(57) ABSTRACT

A server kernel processing system receives an input/output (I/O) request from a user mode computing environment. The I/O request is analyzed to determine whether it is a modification request to modify data in a target volume. If so, target analysis logic determines whether the request is for a target volume that is within a first or second protected volume. If the request is to modify data stored in the first protected volume, the request is blocked. If the request is to modify data in a second protected volume, then a whitelist is examined to determine whether the requesting process and user are on the whitelist. If not, the request is also blocked.

19 Claims, 6 Drawing Sheets

(51) Int. Cl.
*G06F 21/62* (2013.01)
*H04L 9/40* (2022.01)
*H04L 29/08* (2006.01)
*H04L 67/564* (2022.01)
*H04L 67/60* (2022.01)

(56) References Cited

U.S. PATENT DOCUMENTS

| | | | | |
|---|---|---|---|---|
| 8,281,152 | B2* | 10/2012 | LeCrone | G06F 21/6218 713/189 |
| 8,688,734 | B1* | 4/2014 | Tidd | G06F 16/176 707/783 |
| 8,950,007 | B1* | 2/2015 | Teal | H04L 63/20 726/30 |
| 10,380,344 | B1* | 8/2019 | David | H04W 12/128 |
| 10,409,775 | B2* | 9/2019 | Patil | G06F 16/164 |
| 10,924,590 | B1* | 2/2021 | Zhang | H04L 67/34 |
| 11,080,416 | B2* | 8/2021 | Ramakrishnappa | G06F 21/6281 |
| 11,151,273 | B2* | 10/2021 | Kuppusamy | G06F 21/6281 |
| 11,496,899 | B1* | 11/2022 | Koster | H04M 3/436 |
| 2002/0116628 | A1 | 8/2002 | Vignoles et al. | |
| 2004/0133802 | A1* | 7/2004 | Liu | G06F 9/322 712/E9.075 |
| 2006/0100010 | A1 | 5/2006 | Gatto et al. | |
| 2006/0161966 | A1* | 7/2006 | Nagampalli | H04L 63/1408 726/1 |
| 2010/0262735 | A1* | 10/2010 | Arimilli | G06F 9/30047 710/110 |
| 2012/0023583 | A1 | 1/2012 | Sallam | |
| 2012/0167121 | A1* | 6/2012 | Reierson | G06F 9/468 707/803 |
| 2015/0089209 | A1 | 3/2015 | Jacobs et al. | |
| 2018/0089457 | A1* | 3/2018 | Kabra | G06F 21/44 |
| 2019/0278910 | A1* | 9/2019 | Zhang | G06F 21/606 |
| 2019/0318107 | A1* | 10/2019 | Capone | G06F 21/6218 |
| 2020/0110892 | A1* | 4/2020 | Ramakrishnappa | G06F 21/78 |
| 2021/0103669 | A1* | 4/2021 | Shinde | G06F 21/44 |
| 2021/0282059 | A1* | 9/2021 | Li | H04M 1/57 |
| 2021/0390172 | A1* | 12/2021 | Kim | G06F 21/53 |
| 2022/0067195 | A1* | 3/2022 | Kuppusamy | G06F 9/4411 |
| 2022/0188444 | A1* | 6/2022 | Stoler | H04L 9/006 |

FOREIGN PATENT DOCUMENTS

| | | |
|---|---|---|
| CN | 1783081 A | 6/2006 |
| CN | 103077354 A | 5/2013 |
| CN | 104054086 A | 9/2014 |
| CN | 104662552 A | 5/2015 |
| CN | 104917779 A | 9/2015 |
| CN | 103283202 B | 4/2017 |

OTHER PUBLICATIONS

"Office Action Issued in European Patent Application No. 19783804.8", dated Jan. 20, 2023, 7 Pages.
"Office Action Issued in Indian Patent Application No. 202147016071", dated Nov. 25, 2022, 7 Pages.
"Office Action Issued in Indian Patent Application No. 202147016073", dated Dec. 7, 2022, 8 Pages.
"Final Office Action Issued In U.S. Appl. No. 17/475,701", dated Aug. 8, 2023, 21 Pages.
"Notice of Allowance Issued in U.S. Appl. No. 17/475,701", dated Nov. 1, 2023, 8 Pages.
U.S. Appl. No. 16/154,197, filed Oct. 8, 2018.
U.S. Appl. No. 16/154,144, filed Oct. 8, 2018.
U.S. Appl. No. 17/475,701, filed Sep. 15, 2021.
Notification on Grant Received for Chinese Application No. 201980066165.X, mailed on Jan. 30, 2024, 8 pages (English Translation Provided).
Notice of Allowance mailed on Jan. 24, 2024, in U.S. Appl. No. 17/475,701, 7 pages.
Office Action Received for European Application No. 19787551.1, mailed on Nov. 28, 2023, 7 pages.
Decision to grant a European patent pursuant to Article 97(1) Received for European Application No. 19787551.1. mailed on Apr. 5, 2024, 02 pages.
Notice of Allowance mailed on Apr. 18, 2024, in U.S. Appl. No. 17/475,701, 7 pages.
Office Action Received for Chinese Application No. 201980065838.X, mailed on Apr. 7, 2024, 14 pages (English Translation Provided).
Extended European search report Received for European Application No. 24159742.6, mailed on Jun. 14, 2024, 08 pages.
Notice of Office Action Received for Korean Application No. 10-2021-7010268, mailed on Jun. 27, 2024, 7 pages (English Translation Provided).

* cited by examiner

PROTECTING SELECTED DISKS ON A COMPUTER SYSTEM

CROSS-REFERENCE TO RELATED APPLICATION

The present application is a continuation of and claims priority of U.S. patent application Ser. No. 16/154,197, filed Oct. 8, 2018, the content of which is hereby incorporated by reference in its entirety.

BACKGROUND

Computer systems are currently in wide use. Some such computer systems include data centers.

Data centers are formed of large groups of networked computer servers that can be used in a wide variety of different ways. They are often used by businesses or other organizations in order to store, process and disseminate large amounts of information.

Some data centers also host or serve applications, such as electronic mail applications, instant messaging applications, electronic commerce transactions, and a wide variety of others. Similarly, some data centers can store and serve websites to users who access the data centers.

It is not uncommon for multiple different organizations to use the resources on a single data center. Such data centers may include a large number of different server machines that provide the desired access.

Data security for data in a data center is widely considered to be an important feature. Different degrees of security can be obtained by using various forms of data encryption and various forms of authentication.

The discussion above is merely provided for general background information and is not intended to be used as an aid in determining the scope of the claimed subject matter.

SUMMARY

A server kernel processing system receives an input/output (I/O) request from a user mode computing environment. The I/O request is analyzed to determine whether it is a modification request to modify data in a target volume. If so, target analysis logic determines whether the request is for a target volume that is within a first or second protected volume. If the request is to modify data stored in the first protected volume, the request is blocked. If the request is to modify data in a second protected volume, then a whitelist is examined to determine whether the requesting process and user are on the whitelist. If not, the request is also blocked.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Some recent attacks to computer systems used boot sector modification to conduct a malicious operation. Once a malicious piece of code is installed, it proceeds to modify the master boot record which allows the malicious code to intercept and hijack the normal loading process of the infected computer during the next system reboot. This is because the master boot record is a type of boot sector that is normally located at the very beginning of a partition computer mass storage device (such as a hard disc drive). It holds information on how the logical partitions (which can contain file systems) are organized on that particular storage medium. The master boot record normally includes executable code that functions as a loader for the installed operating system. Therefore, once the malicious code has modified the master boot record, it can be used to perform malicious actions, such as encrypt the hard drive and then hold the encrypted data ransom. Of course, it can also be used to modify or erase the data as well.

Similarly, some types of malicious code attempt to target customer data which may be stored in a data center or on a storage device in another type of computing system. For instance, a normally trusted user (such as an administrator or engineer) may be disgruntled, but may still have security permissions to access customer data. The administrator may thus create a piece of code that is an operating system executable file that runs with the administrator privileges. The administrator can thus bypass some existing security checks and destroy customer data. If the administrator installs the malicious code on a production server (that may include customer data), the malicious code may run a script on other servers that have cross-server trust with the original server. Thus, within a matter of days or weeks, the malicious code may replicate itself across many (if not all) servers in a data center, or even in multiple data centers.

The present description thus describes intercepting certain requests or calls to a data center computing system. The type of call can be identified to determine whether it is a call to modify data at a target location. If the target location is one which includes the master boot record, then the call is blocked. If the target location is in another protected location (which includes protected customer data), then a whitelist mechanism is accessed to determine whether the process and/or user making the call are contained on the whitelist. If not, again the call is blocked. If so, the call is executed. The whitelist can be stored on the protected volume as well.

Figure 1:
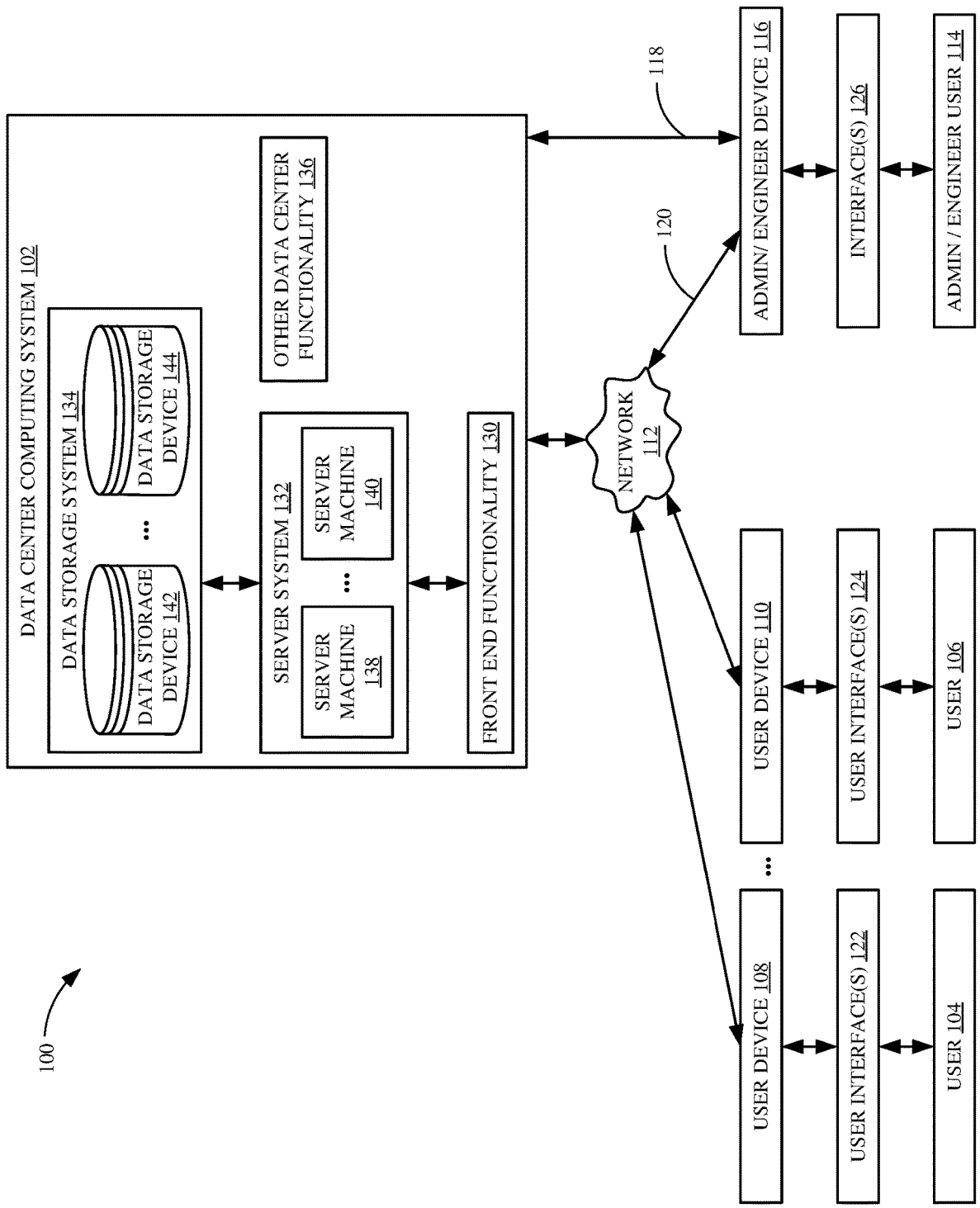
FIG. 1 is a block diagram of one example of a computing system architecture.

FIG. 1 is a block diagram of one example of a computing system architecture 100. Architecture 100 shows data center computing system 102 that can be accessed by a plurality of users 104-106 using user devices 108-110, over network 112. FIG. 1 also shows that an administrator or engineer 114 can access data center computing system 102 using an administrative/engineer device 116. Administrator/engineer 114 can access computing system 102 either directly, as indicated by arrow 118, or through network 112, as indicated by arrow 120.

In the example shown in FIG. 1, user devices 108-110 are shown generating user interfaces 122-124, for interaction by users 104-106, respectively. Users 104-106 interact with their respective user interfaces 122-124 in order to control and manipulate the corresponding user devices 108-110 and some portions of data center computing system 102.

Similarly, device 116 is shown generating interfaces 126 for interaction by user 114. User 114 illustratively interacts with interfaces 126 in order to control and manipulate device 116 and some portions of data center computing system 102. Users 104-106 illustratively access resources (such as data storage, hosted services, and other resources) provided by data center computing system 102.

Network 112 can be any of a wide variety of different types of networks. For instance, it can be a wide area network, a local area network, a near field communication network, a cellular network, or any of a wide variety of other networks or combinations of networks.

Administrator/engineer 114 illustratively performs administrative or engineering operations on data center computing system 102. Therefore, user 114 can gain access to certain portions of data center computing system 102 to perform maintenance operations, to deploy code to fix bugs, to deploy new features, or perform other operations. In order to do so, user 114 is often provided with authentication information or security credentials that allow him or her to access various portions of computing system 102, that are not otherwise accessible.

FIG. 1 shows that, in one example, data center computing system 102 illustratively includes front end functionality 130, server system 132, data storage system 134, and it can include a wide variety of other data center functionality 136. Server system 132 includes a plurality of different server machines 138-140. Data storage system 134 illustratively includes a plurality of different data storage devices 142-144.

Briefly, in operation, front end functionality 130 illustratively receives requests from various users 104-106 that use resources and services hosted by data center computing system 102, and provides those requests to server system 132. Server machines 138-140 illustratively process the requests so that the users 104-106 can manipulate or access data stored in data storage system 134, and specifically on the different data storage devices 142-144. The result of the requests received by front end functionality 130 can be returned to front end functionality 130 by server system 132. Front end functionality 130 can then return the results of the requested operations to the users who requested them.

There are a variety of different types of security systems or techniques that can be deployed to protect data and other items in data center computing system 102. For instance, users 104-106 can be required to provide authentication information in order to access different information. Similarly, administrative/engineer user 114 may be required to provide certain security credentials. In addition, where user 114 wishes to deploy code on data center computing system 102, user 114 may be required to have the code signed or otherwise authenticated or verified before it can be deployed to data center computing system 102.

As an example, user 104 may provide an input/output (I/O) request to perform some operation with respect to data stored in data storage device 142. Engineering user 114 may deploy a piece of code to the kernel of server machine 138 that is intended to perform operations in carrying out the I/O request. In one example, the logic deployed by engineering user 114 can perform management operations on the I/O request, such as creating a file, opening a file or document, closing a file, deleting a file, enumerating files, reading and writing file data, etc.

As a specific example, where the data in data storage devices 142-144 is arranged according to a file system and directories, the code that is deployed by user 114 in order to assist with the management of I/O operations may be known as a filter driver. Filter drivers attach to a device, a memory volume or file system and are loaded into a driver stack corresponding to the volume or file system. When an I/O request is received for that device, volume or file system, it is forwarded to the correct device, file system or volume by a piece of I/O management logic.

A driver stack attached to that device, file system or volume includes the filter drivers that are loaded for the corresponding device, file system or volume, and the/O request is provided to the drivers in that driver stack. Those drivers can include filter drivers that may modify the behavior of the device, file system or volume to which they are attached, in responding to an I/O request. The filter drivers are kernel-mode components meaning that they are executed by the kernel computing system for a particular server machine. The kernel computing system executes a kernel program that is part of the operating system, which manages I/O requests from customer mode components, such as applications. The kernel is loaded on the startup of the computing system and can manage a remainder of the startup operations.

It will be appreciated that, while some examples are described herein in terms of the information in the data storage devices 142-144 being arranged as files in a file system hierarchy, or directory, that need not be the case. Instead, they can be stored in other ways as well. Similarly, while some portions of the present description proceed with respect to file system drivers, driver stacks, and the like, those need not be used either. In other examples, instead of being a file system driver (or filter driver) in a driver stack corresponding to a file system, the operations may be performed by data accessing code that resides in a data accessing system that receives an I/O request from a user mode component and processes it, within the kernel of the server machine, without making use of a "driver", a "filter driver", etc. Instead, the code is simply executed as a separate component in the data accessing system. Different types of examples will be described herein. They are to be considered as examples only, and not limiting the scope of the present discussion.

Regardless of the particular configuration of the architecture 100, it may be that an administrative or engineering user 114 may wish to perform malicious operations on data center computing system 102. Because user 114 has the credentials to have a driver or other data accessing logic (or code) signed or otherwise authenticated to data center computing system 102, user 114 can, in certain circumstances, deploy a malicious driver or another piece of malicious data accessing code to data center computing system 102. For instance, the malicious code may attempt to modify or manipulate code found in the boot sector, or master boot record, of the machine on which the malicious code is installed. In another example, after the machine is booted, then malicious code may attempt to modify sensitive customer data. Computing system 102 may not recognize the malicious code as being malicious because it may contain the appropriate signature or other authentication information.

Thus, as is described below, the present description describes a server kernel processing system in the kernel of server machines 138-140 that reduces the likelihood that this will happen.

The present description provides a piece of logic that intercepts data manipulation calls and identifies the target of each call. If the target is a volume that contains the master boot record, then the data manipulation call is blocked. The present description also proceeds by describing that sensitive customer data can all be partitioned to a particular disc. Data accessing logic that attaches to that disc thus intercepts data manipulation calls to the disc and identifies whether the calling process is allowed to manipulate data on the disc, and/or whether a user associated with the calling process is also allowed to modify data on the disc. In one example, this determination is made by accessing a whitelist mechanism to compare the calling process and/or user to entries on the whitelist to determine whether the calling process and/or user is authorized to access the disc. If not, again, the data manipulation call is blocked.

Figure 2:
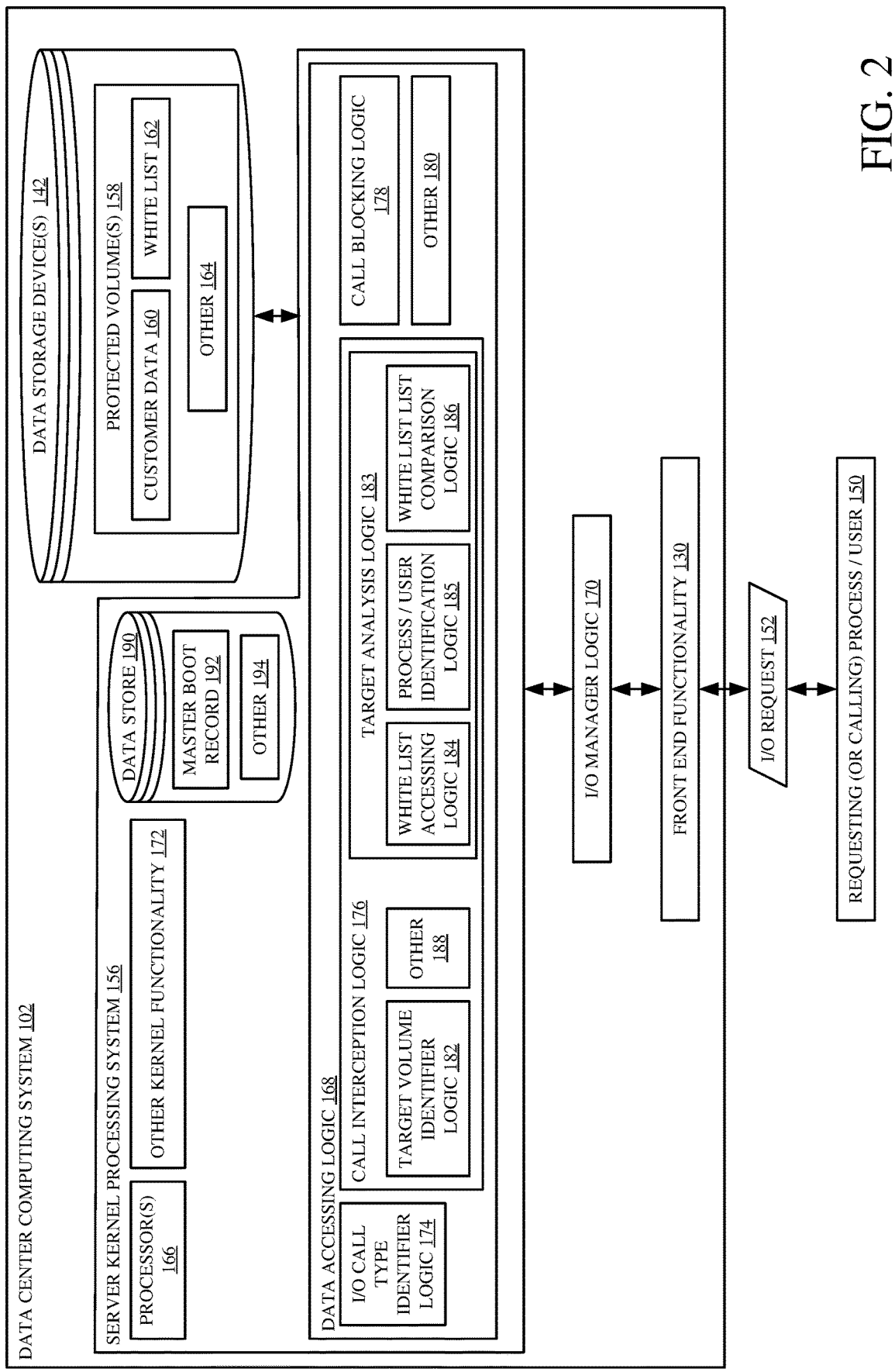
FIG. 2 is a block diagram showing one example of portions of the computing system architecture illustrated in FIG. 1, in more detail.

FIG. 2 is a more detailed block diagram of one example of a portion of the computing system architecture 100 shown in FIG. 1. Some items are similar to those shown in FIG. 1 and they are similarly numbered. In the example shown in FIG. 2, an application or other requesting process or user 150 generates an I/O request 152 that is provided to frontend logic 130 on server machine 138. In the example shown in FIG. 2, server machine 138 includes server kernel processing system 156 and it can include a wide variety of other functionality as well. Server kernel processing system 156 processes the I/O request 152 and, if authorized, accesses data in one of the data storage devices (e.g., data storage device 142). The data can be stored in a file system or in another data volume as indicated by block 158. The data to be accessed can include sensitive customer data 160, whitelist 162, or a wide variety of other data 164. FIG. 2 also shows that system 156 has access to a data store 190 which can store master boot record 192 and other items 194.

In the example shown in FIG. 2, server kernel processing system 156 illustratively includes one or more processors 166, data accessing logic 168, I/O manager 170, and it can include a wide variety of other kernel functionality 172. Data accessing logic 168 can include I/O call type identifier logic 174, call interception logic 176, call blocking logic 178, and it can include other items 180. In the example illustrated, call interception logic 176 illustratively includes target volume identifier logic 182, target analysis logic 183 (which, itself, includes whitelist accessing logic 184, process/user identification logic 185, and whitelist comparison logic 186) and it can include a wide variety of other items 188.

In operation, FIG. 2 shows that the requesting (or calling) process/user 150 may generate I/O requests 152 as a file open request, a file write request, a read request, a file create request, a file delete request, or a wide variety of other requests that may be issued to access information on data storage device 142. Front end functionality 130 illustratively exposes an interface to receive request 152 and provides the request to I/O manager logic 170. There may be a variety of different instances of data accessing logic 168 on server machine 138. Therefore, I/O manager logic 170 routes the I/O request 152 to the proper set of data accessing logic 168 for processing. When data accessing logic 168 receives I/O request 152, then I/O call type identifier 174 identifies the type of the call (or I/O request) that is being made. For instance, as discussed above, it may be a file open request, a create request, a delete request, a read request, a write request, etc.

In one example, if call type identifier 174 identifies the I/O request as a file modification request of any type (e.g., a request that would perform any modification on the data for which access is being requested), then call interception logic 176 intercepts that call. Target volume identifier logic 182 then identifies the target volume where the data to be manipulated is stored. Logic 182 identifies whether the target is in the master boot record (or boot sector) in data store 190.

If the target of the data manipulation (or modification) call is in master boot record 192, then logic 182 generates a signal indicating this to call blocking logic 178. Call blocking logic 178 blocks the call (or I/O request) 152 from being executed.

However, if target volume identifier logic 182 identifies that the target is not in master boot record 192, but is instead directed to another volume or set of memory locations, then logic 182 determines whether that volume is protected volume 158 where whitelist 162 or customer data 160 (or both) reside, and which has been partitioned to a disk in data storage device 142. If so, then process/user identification logic 185 parses request 152 to identify the calling process and/or user 150. Whitelist accessing logic 184 accesses whitelist 162 and whitelist comparison logic 186 determines whether the calling process/user 150 is on the whitelist (or is authorized to perform a data manipulation or modification operation in protected volume 158, based upon the entries in whitelist 162).

By way of example, it may be that whitelist 162 includes entries that identify processes and/or users that are authorized to have access to protected volume 158. If whitelist comparison logic 186 determines that the requesting process/user 150 is not identified by whitelist 162, then it indicates this to call blocking logic 178 and logic 178 blocks the call (or request) 152 from being executed. It will be noted that, by storing whitelist 162 inside protected volume 158, an unauthorized process/user 150 cannot modify the whitelist 162 or customer data 160. However, it will be noted that whitelist 162 can be stored separately from customer data 160 as well.

Figure 3:
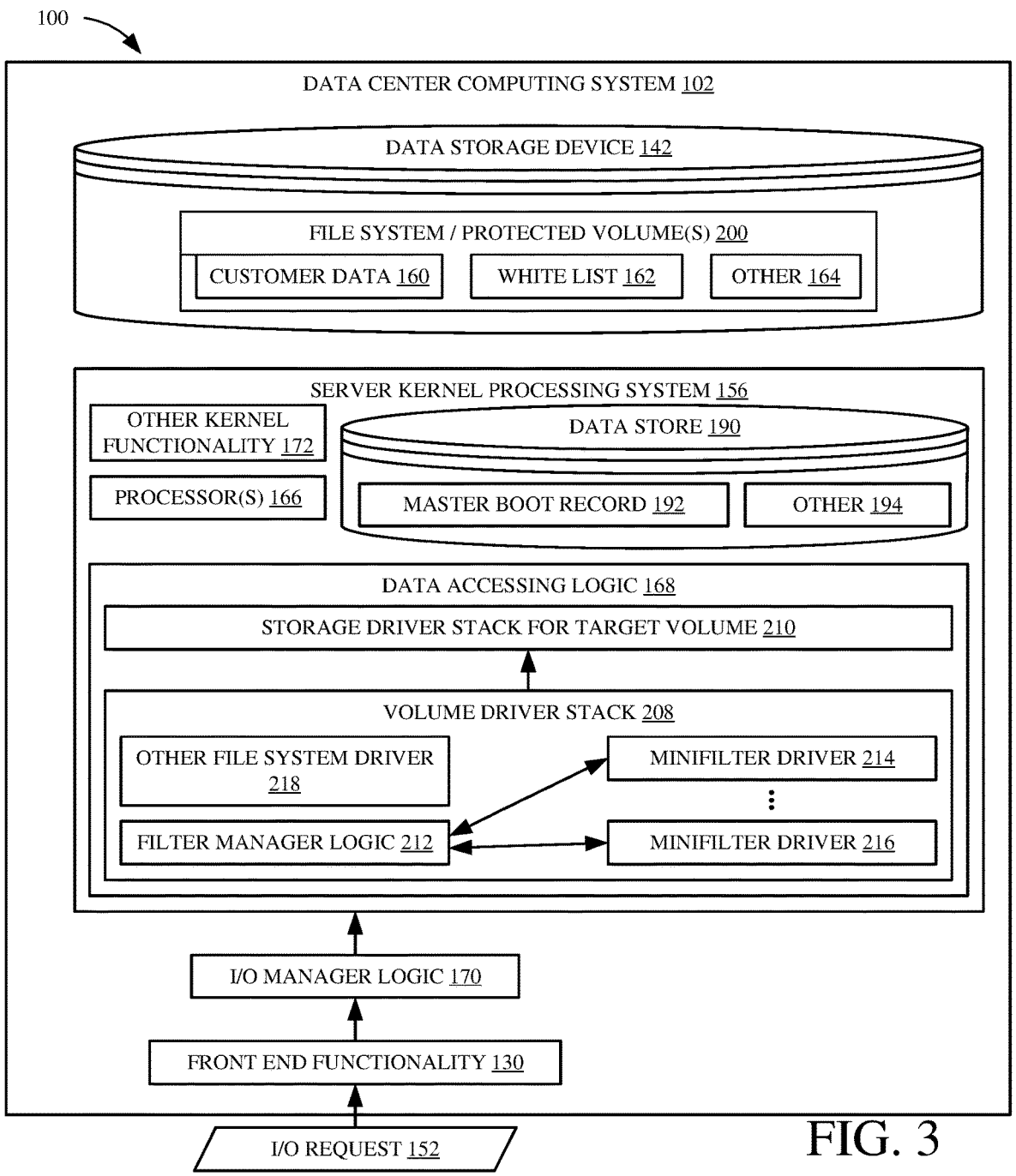
FIG. 3 is a block diagram showing another example of portions of the computing system architecture illustrated in FIG. 1, in more detail.

FIG. 3 shows another example of a portion of data center computing system 102, in more detail than that shown in FIG. 1. Some items in FIG. 3 are similar to those shown in FIG. 2, and they are similarly numbered. However, in the example shown in FIG. 3, data is stored in data storage device 142 in various file systems. Thus, data storage device 142 is shown storing a file system/protected volume 200 that stores customer data 160, whitelist 162, and it can store other items 164.

In the example shown in FIG. 3, data accessing logic 168 includes file system/volume driver stack 208, for the target file system/volume and storage driver stack 210, for the target volume to be accessed, that is the target of the I/O request 152. FIG. 3 also shows that, in one example, volume driver stack 208 includes filter manager logic 212 that has a plurality of different minifilter drivers 214-216 attached to it. It can include a wide variety of other filter drivers 218 as well.

There may be a plurality of different driver stacks that are attached to different devices, files systems or volumes. Therefore, when I/O request 152 is received, I/O manager logic 170 identifies the particular device, file system or volume that is the subject (or target) of the I/O request 170, and forwards the I/O request 170 to the driver stack attached to that device, file system or volume. In the example shown in FIG. 3, I/O manager logic 170 forwards the I/O request 152 to the device, file system or volume driver stack 208.

The various filter drivers in driver stack 208 modify the I/O request 150 or perform processing on the I/O request 150 that is received. In some cases, filter driver logic is shared among different filter drivers. In such a case, filter manager logic 212 may support the plurality of different minifilter drivers 214-216. Logic 212 includes the common functionality for the minifilter drivers supported by filter manager logic 212. The minifilter drivers 214-216, themselves, include additional logic thus performing different filtering steps. The location of the filter drivers (e.g., minifilter drivers 214-216 among the other file system drivers 212 in driver stack 208) can be specified or it can be determined based on the order of loading the drivers.

In operation, filter manager logic 212 illustratively receives the I/O request 170 and provides it for operation by minifilter drivers 214-216 in an order determined by their order within stack 208. Once the minifilter drivers 214-216, which are attached to filter manager logic 212, have executed on the I/O request 152, the result can be provided to other file system filter drivers 218. The resultant I/O request (after all filter drivers in stack 208 have operated on it) is then provided to the storage driver stack 210 for the particular data storage device 142 where the target file resides. For instance, if the I/O request 152 is to operate on a file within data storage device 142, then the I/O request is provided from driver stack 208 to the storage driver stack for storage device 142. This is an example only.

In the example shown in FIG. 3, minifilter drivers 214-216 can be provided to determine whether the I/O request 152 is a data manipulation (or data modification) request. A minifilter driver (either the same one or a different one) can then determine whether the target of the data manipulation request is the master boot record 192, or a protected volume 158. If it is the master boot record 192, then the same minifilter driver (or a different one) can block execution of the I/O request. If the target is a protected volume 158, then one or more minifilter drivers can parse the I/O request 152 to identify the calling process and/or user, access whitelist 162 and determine whether the calling process/user is authorized based on the entries in whitelist 162. Again, if not, the call is blocked from being executed.

Figure 4:
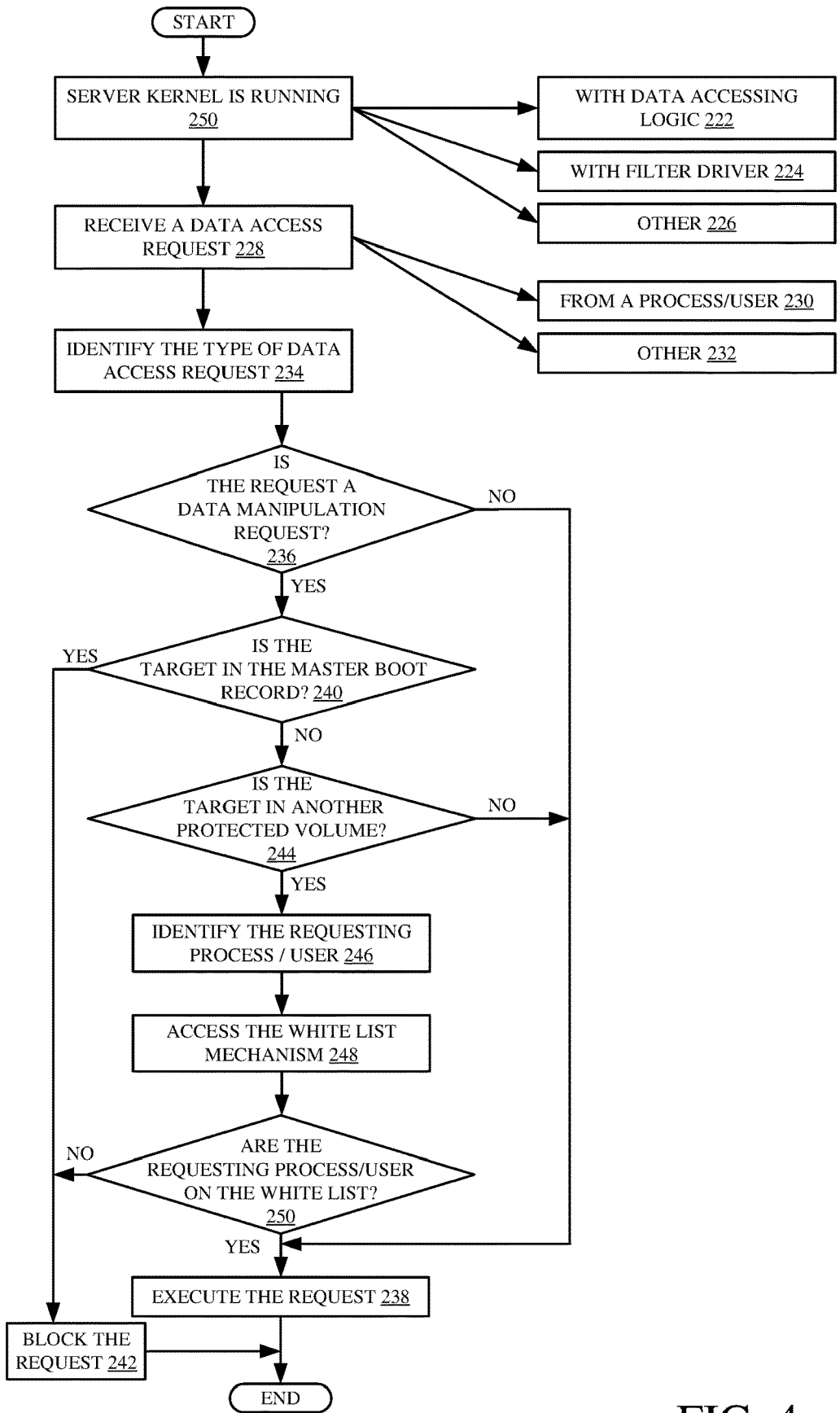
FIG. 4 is a flow diagram illustrating one example of the operation of a server kernel processing system in processing an input/output (I/O) request.

FIG. 4 is a flow diagram illustrating one example of the operation of data accessing logic 168 (either in FIG. 2 or in FIG. 3). It is first assumed that the server kernel is running a server kernel processing system 156. This is indicated by block 220 in the flow diagram of FIG. 4. It is also assumed that the server kernel is running with data accessing logic 168. This is indicated by block 222. The data accessing logic can be one of those shown in FIG. 2 or FIG. 3, or different data accessing logic. In one example, the data accessing logic 168 is provided with filter drivers (such as volume driver stack 208). This is indicated by block 224 in the flow diagram of FIG. 4. The server kernel can of course include other items as well. This is indicated by block 226.

Front end logic 130 receives a data access request 152. This is indicated by block 228. In one example, the request is received from a calling process/user. This is indicated by block 230. The calling process can be an operating system process, or a different process. The data access request can be received in other ways as well, and this is indicated by block 232.

The data accessing logic 168 then identifies the type of data access request to determine whether it is a data manipulation request (or modification request, such as a delete request, a write request, etc.). This is indicated by block 234. In one example, this can be performed by I/O call type identifier logic 174 (shown in FIG. 2) or by a minifilter driver 214 shown in FIG. 3. It can be done in other ways as well.

If, as determined at block 236, it is determined that the request is not a data manipulation (or modification) request, then the request is executed (or at least passed on to further filter drivers or other processing logic, for further execution). This is indicated by block 238 in the flow diagram of FIG. 4.

If, at block 236, it is determined that the request is a data manipulation (or modification) request, then it is determined whether the target of the data manipulation request is the master boot record 192. This is indicated by block 240 in the flow diagram of FIG. 4. Again, this can be determined by target volume identifier logic 182 (shown in FIG. 2) or a minifilter driver 214-216 (shown in FIG. 3). Where it is performed by a minifilter driver, it can be the same minifilter driver (or other filter driver) that identified whether the request was a data manipulation request, or it can be a different one.

If, at block 240, it is determined that the data request is targeting the master boot record, then the call is blocked. This is indicated by block 242. Again, this can be done by call blocking logic 178 (shown in FIG. 2) or by a minifilter driver (shown in FIG. 3).

If, at block 240, it is determined that the target of the data manipulation request is not the master boot record, then it is determined whether the target is in another protected volume (such as protected volume 158 or protected volume 200, shown in FIGS. 2 and 3, respectively). This is indicated by block 244 in the flow diagram of FIG. 4. Determination as to whether the data manipulation request is targeting a protected volume can be determined by target volume identifier logic 182, or by a minifilter driver 214-216. The target volume can be compared against known protected volumes. The identity of the known protected volumes can be stored, themselves in a protected volume or elsewhere.

If, at block 244, it is determined that the target volume is not a protected volume, then processing again moves to block 238 where the I/O request is executed (or at least passed on for further processing).

However, if, at block 244, it is determined that the target of the data manipulation request is in a protected volume, then the request is parsed to identify the requesting process and/or user. This is indicated by block 246. This can be done by process/user identification logic 185 (shown in FIG. 2) or by a minifilter driver (or other filter driver) shown in FIG. 3.

The whitelist 162 is then accessed to determine whether it includes entries that authorize the requesting process/user to access the protected volume 158, 200. Accessing the whitelist mechanism is indicated by block 248 in the flow diagram of FIG. 4. This can be done by whitelist accessing logic 184, or by a minifilter driver 214-216 or another filter driver 218.

The identified requesting process/user is then compared to the whitelist to determine whether the requesting process/user is authorized by the whitelist. This is indicated by block 250, and this can also be performed by whitelist comparison logic 186 or a minifilter driver 214-216 or another filter driver 218. Any or all of these mechanisms are contemplated herein. If the requesting process/user is authorized by the whitelist, then the processing continues at block 238 where the request is passed on for further execution. However, if, at block 250, it is determined that the requesting process/ user is not authorized by the whitelist mechanism, then processing continues at block 242 where the request is blocked.

It can thus be seen that the present system greatly enhances the security of the computing system itself. It intercepts all file data manipulation (or modification) requests and determines whether the target file is in the master boot record. If so, the request is blocked. If not, it then determines whether the target of the data manipulation (or modification) request is in a protected volume. If it is, then the requesting process/user is examined for authorization by a whitelist mechanism (which may be stored in the same protected volume). Only if that authorization is present is the request executed. If the authorization is not present, then the request is again blocked.

In one example, the whitelist is a list of authorized users and requesting processes that can perform data manipulations or other operations on different volumes (or ranges of memory locations). The whitelist can be protected in a wide variety of different ways. In one example, if a requesting process or user is on a whitelist that is attached to a particular device, volume or file system, then that requesting process and/or user is authorized to perform operations on that device or in that volume or file system. If not, they are not authorized to do so.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
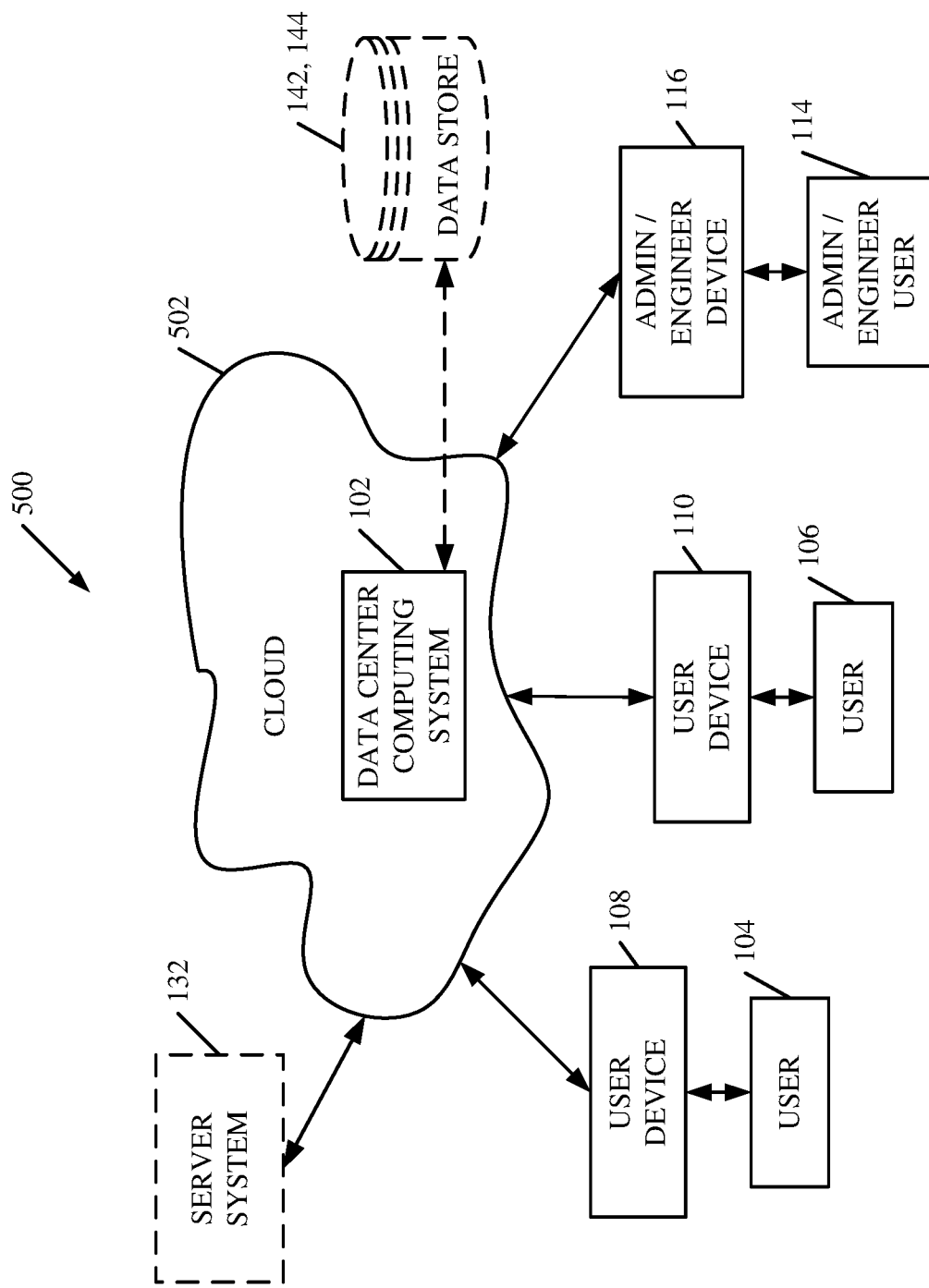
FIG. 5 is a block diagram showing the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that data center computing system 102 can be located in cloud 502 (which can be public, private, or a combination where portions are public while others are private). Therefore, users 104, 106, 114 use a user devices 108, 110, 116 to access those systems through cloud 502.

FIG. 5 also depicts another example of a cloud architecture. FIG. 5 shows that it is also contemplated that some elements of computing system 102 can be disposed in cloud 502 while others are not. By way of example, data stores 142, 144 can be disposed outside of cloud 502, and accessed through cloud 502. In another example, system 132 (or other items) can be outside of cloud 502. Regardless of where they are located, they can be accessed directly by devices 108, 110, 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
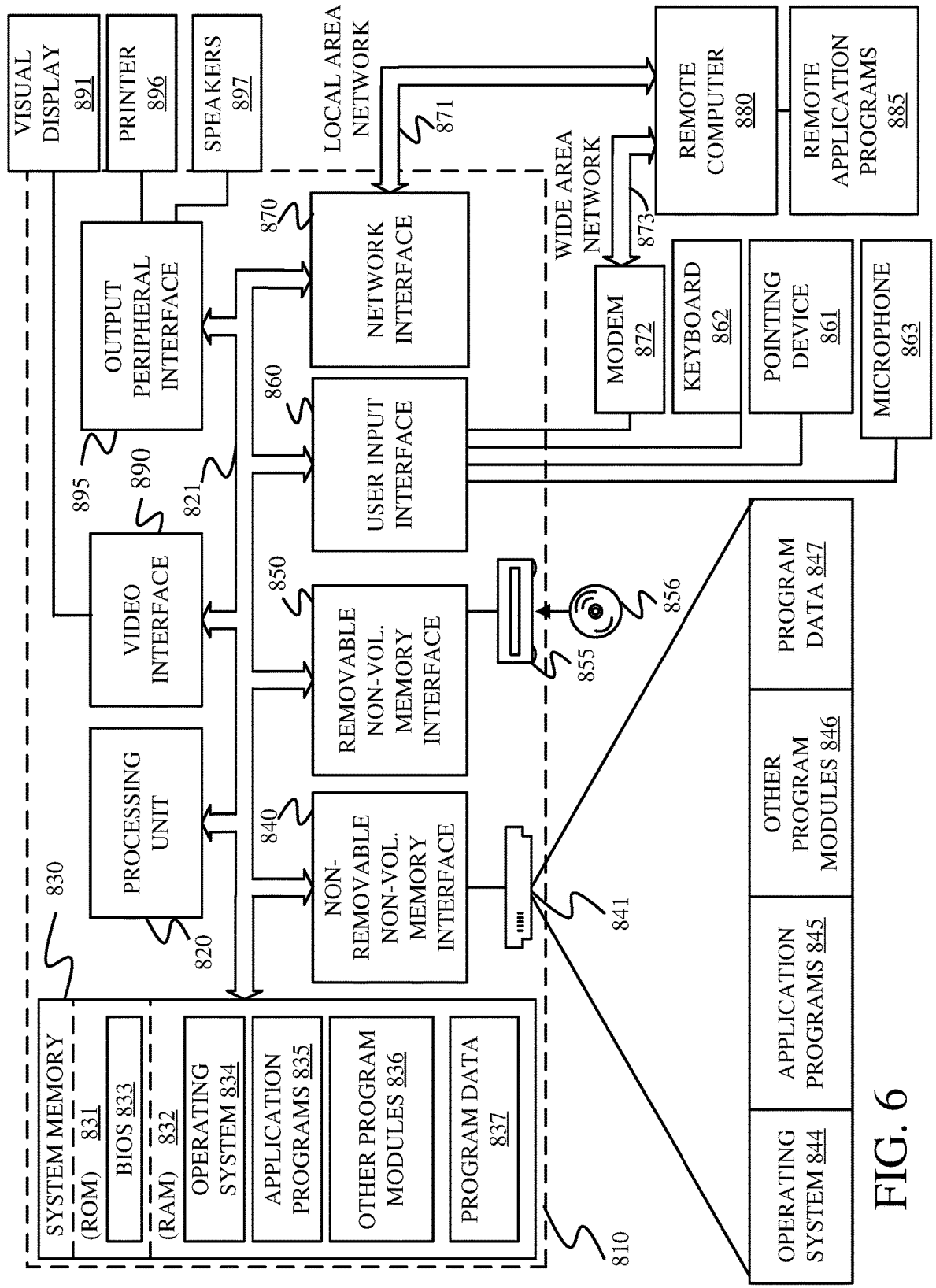
FIG. 6 is a block diagram showing one example of a computing environment that can be used in the architectures shown in the previous figures.

FIG. 6 is one example of a computing environment in which architecture 100, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

Example 1 is a computing system, comprising:
  data accessing logic, in a server kernel, that receives a request, from a calling process, to perform an operation on data stored on a data storage device;
  call interception logic, in the server kernel, that intercepts the request before the request is executed and that, if the request is a data manipulation request to manipulate target data, identifies a storage location where the target data is stored and determines whether the storage location is in a master boot record corresponding to the computing system and, if the storage location is in the master boot record, generates an interception signal indicating that the target data is in the master boot record;
  target analysis logic, in the server kernel, that, if the if the storage location is not in the master boot record, determines whether the storage location is on a disk that holds a protected storage volume and, if so, determines whether the requesting process is authorized by a whitelist file and generates an authorization signal indicative of whether the requesting process is authorized by the whitelist file; and
  call blocking logic that, if the storage location of the target data is in the master boot record, blocks the request from being executed based on the interception signal, and if the storage location for the target data is on the disk that holds the protected storage volume and the requesting process is not authorized by the whitelist file, blocks the request from being executed based on the authorization signal.

Example 2 is the computing system of any or all previous examples and further comprising:
  call type identifier logic, in the server kernel, configured to identify whether the request is the data manipulation request to manipulate target data.

Example 3 is the computing system of any or all previous examples wherein the call interception logic comprises:
  target volume identifier logic configured to identify the storage location of the target data to determine whether the target data is in the master boot record and to generate the interception signal.

Example 4 is the computing system of any or all previous examples wherein the target analysis logic comprises:
  process identification logic configured to identify the calling process.

Example 5 is the computing system of any or all previous examples wherein the target analysis logic comprises:
  whitelist accessing logic configured to, if the authorization signal indicates that the storage location is not located in the master boot record, access the whitelist file to identify entries in the whitelist file.

Example 6 is the computing system of any or all previous examples wherein the target analysis logic comprises:
  whitelist comparison logic configured to compare the calling process with the entries in the whitelist file to determine whether the calling process is identified by an entry in the whitelist file and, if so, generate an authorization output indicating that the calling process is authorized by the whitelist file.

Example 7 is the computing system of any or all previous examples wherein the target analysis logic comprises:
  user identification logic configured to identify a user originating the request in the calling process.

Example 8 is the computing system of any or all previous examples wherein the whitelist comparison logic is configured to compare the identified user with the entries in the whitelist file to determine whether the identified user is identified by an entry in the whitelist file and, if so, generate an authorization output indicating that the identified user is authorized by the whitelist file.

Example 9 is the computing system of any or all previous examples wherein the request is to access a file in a file system, with an attached driver stack of loaded filter drivers that are loaded into the server kernel, for execution by the server kernel.

Example 10 is the computing system of any or all previous examples wherein the call interception logic comprises a filter driver in the driver stack attached to the file system.

Example 11 is the computing system of any or all previous examples wherein the call target analysis logic comprises a filter driver in the driver stack attached to the file system.

Example 12 is the computing system of any or all previous examples wherein the call blocking logic comprises a filter driver in the driver stack attached to the file system.

Example 13 is a computer implemented method, comprising:
  receiving, at a server kernel, a request, from a calling process, to perform an operation on data stored on a data storage device;
  intercepting, with the server kernel, the request before the request is executed;
  if the request is a data manipulation request to manipulate target data, identifying a storage location where the target data is stored and determining whether the storage location is in a master boot record corresponding to the computer;
  if the storage location is in the master boot record, generating with the server kernel an interception signal indicating that the target data is in the master boot record;
  if the if the storage location is not in the master boot record, determining, with the server kernel, whether the storage location is on a disk that holds a protected storage volume and, if so, determining whether the requesting process is authorized by a whitelist file and generating an authorization signal indicative of whether the requesting process is authorized by the whitelist file; and
  if the storage location of the target data is in the master boot record, blocking the request from being executed based on the interception signal, and if the storage location for the target data is on the disk that holds the protected storage volume and the requesting process is not authorized by the whitelist file, blocking the request from being executed based on the authorization signal.

Example 14 is the computer implemented method of any or all previous examples and further comprising:
identifying, with the server kernel, whether the request is the data manipulation request to manipulate target data.

Example 15 is the computer implemented method of any or all previous examples wherein determining whether the requesting process is authorized by the white list file comprises:
identifying the calling process; and
accessing the whitelist file to identify entries in the whitelist file.

Example 16 is the computer implemented method of any or all previous examples wherein determining whether the requesting process is authorized by the white list file comprises:
comparing the calling process with the entries in the whitelist file to determine whether the calling process is identified by an entry in the whitelist file; and
if so, generating an authorization output indicating that the calling process is authorized by the whitelist file.

Example 17 is the computer implemented method of any or all previous examples and further comprising:
identifying a user originating the request in the calling process;
comparing the identified user with the entries in the whitelist file to determine whether the identified user is identified by an entry in the whitelist file; and
if so, generating an authorization output indicating that the identified user is authorized by the whitelist file.

Example 18 is the computer implemented method of any or all previous examples wherein the request is to access a file in a file system, with an attached driver stack of loaded filter drivers that are loaded into the server kernel, for execution by the server kernel and wherein intercepting the request comprises:
executing a filter driver in the driver stack attached to the file system.

Example 19 is the computer implemented method of any or all previous examples wherein determining whether the requesting process is authorized comprises:
the call target analysis logic comprises executing a filter driver in the driver stack attached to the file system.

Example 20 is a computing system, comprising:
data accessing logic, in a server kernel, that receives a request, from a calling process, to perform an operation on data stored on a data storage device;
call type identifier logic, in the server kernel, configured to identify whether the request is a data manipulation request to manipulate target data;
call interception logic, in the server kernel, that intercepts the request before the request is executed and that, if the request is the data manipulation request to manipulate target data, identifies a storage location where the target data is stored and determines whether the storage location is in a master boot record corresponding to the computing system and, if the storage location is in the master boot record, generates an interception signal indicating that the target data is in the master boot record;
process identification logic configured to identify the calling process;
target analysis logic, in the server kernel, that, if the if the storage location is not in the master boot record, determines whether the storage location is on a disk that holds a protected storage volume;
whitelist accessing logic configured to, if the authorization signal indicates that the storage location is not located in the master boot record but is located on a disk that holds a protected volume, access the whitelist file to identify entries in the whitelist file;
whitelist comparison logic configured to compare the calling process with the entries in the whitelist file to determine whether the calling process is identified by an entry in the whitelist file and, if so, generate an authorization output indicating that the calling process is authorized by the whitelist file; and
call blocking logic that, if the storage location of the target data is in the master boot record, blocks the request from being executed based on the interception signal, and if the storage location for the target data is on the disk that holds the protected storage volume and the requesting process is not authorized by the whitelist file, blocks the request from being executed based on the authorization signal.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
at least one processor; and
memory storing instructions executable by the at least one processor, wherein the instructions, when executed, provide a kernel-mode component in the computing system, the kernel-mode component configured to:
receive a first data manipulation request to manipulate first target data;
identify a first storage location of the first target data;
based on determining the first storage location is on a data storage device that holds a protected storage volume, compare a calling process corresponding to the first data manipulation request to an entry in a whitelist file, the entry identifying an authorized calling process that is authorized to access the protected storage volume;
based on the comparison of the calling process to the entry in the whitelist file, generate an instruction to block the first data manipulation request from being executed;
intercept a second data manipulation request before the second data manipulation request is executed;
based on determining the second data manipulation request requests manipulation of second target data, identify a second storage location where the second target data is stored; and
based on determining that the second storage location is in a master boot record, block the second data manipulation request from being executed.

2. The computing system of claim 1, wherein the whitelist file identifies a plurality of authorized calling processes that are authorized to access the protected storage volume, and an authorization signal is generated based on a comparison of the calling process to the plurality of authorized calling processes.

3. The computing system of claim 2, wherein
the whitelist file stores a set of data entries, and
each data entry, of the set of data entries, identifies a different authorized calling process, of the plurality of authorized calling processes, that is authorized to access the protected storage volume.

4. The computing system of claim 1, wherein the kernel-mode component is executed by a kernel of the computing system and is attached to the data storage device that stores the first target data.

5. The computing system of claim 4, wherein the kernel-mode component comprises a volume driver that is loaded into a volume driver stack corresponding to the protected storage volume.

6. The computing system of claim 5, wherein the volume driver is configured to receive the first data manipulation request and forward the first data manipulation request to the data storage device.

7. The computing system of claim 1, wherein the kernel-mode component is configured to:
identify a target volume that includes the first storage location; and
compare the target volume to one or more identifiers that identify protected volumes.

8. The computing system of claim 1, wherein the kernel-mode component is configured to identify a user originating the first data manipulation request in the calling process.

9. The computing system of claim 8, wherein the kernel-mode component is configured to generate an authorization output indicating that the user is authorized by the whitelist file.

10. A method performed by a computing system kernel, the method comprising:
receiving a first data manipulation request to manipulate first target data;
identifying a first storage location of the first target data;
based on determining the first storage location is on a data storage device that holds a protected storage volume, comparing a calling process corresponding to the first data manipulation request to an entry in a whitelist file, the entry identifying an authorized calling process that is authorized to access the protected storage volume;
based on the comparing the calling process to the entry in the whitelist file, generating an instruction to block the first data manipulation request from being executed;
intercepting a second data manipulation request before the second data manipulation request is executed;
based on determining the second data manipulation request requests manipulation of second target data, identifying a second storage location where the second target data is stored; and
based on determining that the second storage location is in a master boot record, blocking the second data manipulation request from being executed.

11. The method of claim 10, wherein the whitelist file identifies a plurality of authorized calling processes that are authorized to access the protected storage volume, and the method comprises generating an authorization signal based on a comparison of the calling process to the plurality of authorized calling processes.

12. The method of claim 10, wherein the computing system kernel comprises a server kernel.

13. The method of claim 12, wherein the computing system kernel is attached to the data storage device that stores the first target data.

14. The method of claim 13, wherein the computing system kernel comprises a volume driver, and the method comprising loading the volume driver into a volume driver stack corresponding to the protected storage volume.

15. The method of claim 14, and comprising:
receiving, by the volume driver, the first data manipulation request and forwarding the first data manipulation request to the data storage device.

16. The method of claim 10, wherein determining the first storage location is on a data storage device that holds a protected storage volume comprises:
identifying a target volume that includes the first storage location; and
comparing the target volume to one or more identifiers that identify protected volumes.

17. The method of claim 1, and comprising identifying a user originating the first data manipulation request in the calling process.

18. The method of claim 17, and comprising generating an authorization output indicating that the user is authorized by the whitelist file.

19. A computing system comprising:
at least one processor; and
memory storing instructions executable by the at least one processor, wherein the instructions, when executed, provide a kernel-mode component in the computing system, the kernel-mode component configured to:
receive a data manipulation request to manipulate target data;
intercept the data manipulation request before the data manipulation request is executed;
determine a storage location of the target data;
block the data manipulation request from being executed in response to the storage location being in a master boot record; and
block the data manipulation request from being executed in response to:
the storage location being on a data storage device that holds a protected storage volume; and
a comparison of a calling process corresponding to the data manipulation request and an entry in a whitelist file, the entry identifying an authorized calling process that is authorized to access the protected storage volume.

* * * * *